(12) United States Patent
Tan et al.

(10) Patent No.: US 10,989,311 B2
(45) Date of Patent: Apr. 27, 2021

(54) MANUALLY CONTROLLED HIGH PRESSURE VALVE AND A GLASS CHILLER USING THEREOF

(71) Applicant: Shenzhen Changzhi Electronic Technology Co., Ltd., Guangdong (CN)

(72) Inventors: Deben Tan, Guangdong (CN); Shaolin Wang, Guangdong (CN)

(*) Notice: Subject to any disclaimer, the term of this patent is extended or adjusted under 35 U.S.C. 154(b) by 135 days.

(21) Appl. No.: 16/398,274

(22) Filed: Apr. 30, 2019

(65) Prior Publication Data
US 2020/0072361 A1    Mar. 5, 2020

(30) Foreign Application Priority Data

Aug. 30, 2018    (CN) .......................... 201811003717.6

(51) Int. Cl.
| | | |
|---|---|---|
| *F16K 1/30* | (2006.01) | |
| *F25D 31/00* | (2006.01) | |
| *F16K 1/46* | (2006.01) | |
| *F16K 35/02* | (2006.01) | |

(52) U.S. Cl.
CPC .............. *F16K 1/308* (2013.01); *F16K 1/306* (2013.01); *F16K 1/465* (2013.01); *F16K 35/025* (2013.01); *F25D 31/008* (2013.01)

(58) Field of Classification Search
CPC .......... F16K 1/308; F16K 1/306; F16K 1/301; F16K 1/302; F16K 1/304; F16K 31/60; F16K 31/58; F16K 31/602; F16K 21/04; F25D 3/107; F25D 3/102; F25D 3/10; F25D 31/008; F25D 31/006; B05B 1/3013; B05B 1/304; B05B 1/3066; B05B 11/0094

USPC ................................................ 137/616, 616.5
See application file for complete search history.

(56) References Cited

U.S. PATENT DOCUMENTS

| | | | | |
|---|---|---|---|---|
| 3,045,694 A | * | 7/1962 | Hammon ................ | F16K 21/04 137/328 |
| 3,610,280 A | * | 10/1971 | Kitamura ................. | E03C 1/04 137/616.5 |
| 3,858,771 A | * | 1/1975 | Bret ........................ | F16K 1/301 222/402.2 |
| 5,103,857 A | * | 4/1992 | Kuhn ...................... | F16K 21/04 137/315.13 |
| 2004/0231729 A1 | * | 11/2004 | Lang ....................... | F16K 35/04 137/557 |
| 2014/0048169 A1 | * | 2/2014 | Pisot ........................ | F17C 5/06 141/4 |
| 2016/0161012 A1 | * | 6/2016 | Jaeckle ................... | F16K 27/02 137/543.17 |

* cited by examiner

*Primary Examiner* — Kelsey E Cary

(57) ABSTRACT

A manually controlled high pressure valve includes a valve body having an air inlet, an air outlet and a mounting hole; an adjusting device arranged in the mounting hole by hermetically connecting to the inside wall of the mounting hole and having an air inlet hole and an air outlet hole; a limiting block arranged below the adjusting device and matched with the adjusting device and the air inlet for controlling the air intake from the air inlet hole of the adjusting device. The limiting block can be jacked up by the high pressure of the air inlet and block off the air inlet to stop jetting outwardly when the gas is not exhausted from the air outlet of the valve; and the limiting block can be removed to form a gap between the limiting block and the inlet hole when it is required to jet outwardly.

18 Claims, 10 Drawing Sheets

MANUALLY CONTROLLED HIGH PRESSURE VALVE AND A GLASS CHILLER USING THEREOF

CROSS REFERENCE TO RELATED APPLICATIONS

The present application claims the benefit of Chinese Patent Application No. 201811003717.6 filed on Aug. 30, 2018, the contents of which are incorporated herein by reference in its entirety.

FIELD

The invention relates to a technical field of control valves in dry ice cooling, particularly to a manually controlled high pressure valve and a glass chiller using the valve of the invention.

BACKGROUND OF THE INVENTION

Valves are control components in the fluid delivery system and have functions of shut-off, regulating, diversion, counter-flow prevention, pressure stabilization, shunting or overflow relief.

Valves for fluid control systems range in varieties and sizes from the simplest shut-off valves to the various valves used in extremely complex autonomous systems. Valves can be used for controlling the flow of various types of fluids such as air, water, steam, various corrosive media, mud, oil, liquid metal and radioactive media. According to materials, valves are divided into cast iron valves, cast steel valves, stainless steel valves (201, 304, 316, etc.), chrome-molybdenum steel valves, chrome moly-vanadium steel valves, duplex steel valves, plastic valves, nonstandard customized valves and the like.

However, valves used in the field of dry ice cooling are relatively rare in the market at present, due to the sensitivity of the change between the three-phases of solid, liquid, and gas of dry ice, the pressure requirement of the valve is quite high, and it is quite troublesome to control the valve on and off for the need to intermittent injection of carbon dioxide gas separately, and the technical difficulty is large.

Accordingly, there is a need in the market for a manually controlled high pressure valve that can solve one or more of the above problems and a glass chiller that uses the valve.

SUMMARY OF THE INVENTION

To solve one or more problems in the prior art, the present invention provides a manually controlled high pressure valve and a glass chiller using thereof.

The technical solution provided herein to achieve the above purposes is: a manually controlled high pressure valve comprising a valve body having an air inlet, an air outlet and a mounting hole; an adjusting device arranged in the mounting hole by hermetically connecting to the inside wall of the mounting hole and having an air inlet hole and an air outlet hole for controlling the connection or closing of the air inlet and the air outlet; and a limiting block arranged below the adjusting device and matched with the adjusting device and the air inlet for controlling the air intake from the air inlet hole of the adjusting device.

In some embodiments, the adjusting device disclosed herein comprises a connecting pipe arranged in the mounting hole which has an open at the upper end, wherein the air inlet hole is arranged at the lower end of the connecting pipe and the air outlet hole is arranged on the side wall of the connecting pipe; two first annular sealing rings arranged on the side wall of the connecting pipe and situated on the upper and the lower sides of the air outlet hole and hermetically connected to the inside wall of the mounting hole; a sealing cover having a first through hole in the middle arranged at the upper end of the connecting pipe and hermetically connected to the upper end of the connecting pipe; a pressing rod having an annular protrusion on its side wall penetrated through the first through hole and inserted into the connecting pipe; a spring for returning the pressing rod sleeved outside the pressing rod with its one end arranged on the upper end face of the sealing cover and the other end arranged on the lower end face of the annular protrusion; and a fixing sleeve with its upper end penetrated through the top of the pressing rod and cooperatively connected to the annular protrusion and the lower end detachably connected to the mounting hole.

In some embodiments, the mounting hole disclosed herein comprises a first mounting hole; and a second mounting hole arranged at the lower end of the first mounting hole and connected with the first mounting hole; wherein the diameter of the second mounting hole is smaller than that of the first mounting hole; and the diameter of the second mounting hole is larger than that of the limiting block.

In some embodiments, the air inlet disclosed herein comprises a first air inlet; and a second air inlet arranged at the upper end of the first air inlet and connected with the first air inlet and the mounting hole; wherein the diameter of the second air inlet is smaller than that of the first air inlet; and the diameter of the second air inlet is smaller than that of the limiting block.

In some embodiments, the valve disclosed herein further comprises a pressing device rotatably arranged on the valve body for facilitating pressing of the pressing rod; wherein the pressing device comprises a first connecting rod rotatably connected to the valve body; a second connecting rod integrally formed with the first connecting rod and forming an obtuse angle with the first connecting rod.

In some embodiments, the sealing cover disclosed herein comprises a cylindrical sealing cover body having a first through hole in the middle; and a second annular sealing ring fixedly arranged on the lower surface of the cylindrical sealing cover body and surrounded the periphery of the first through hole.

In some embodiments, the upper end of the sealing cover further has an end cover which has a second through hole in the middle and matches with the sealing cover and detachably connects with the connecting pipe to secure the sealing cover at the upper end of the connecting pipe.

In some embodiments, the connecting pipe disclosed herein comprises a connecting pipe body with its upper end opening and its lower end arranged with an air inlet hole and its side wall arranged with an air outlet hole; a sealing ring groove arranged on the side wall of the connecting pipe and matched with the first annular sealing ring; and a stepped counter arranged on the upper end surface of the connecting pipe body and matched with the sealing cover and the end cover; wherein the pressing rod can penetrate through the air inlet hole; and the diameter of the air inlet hole is smaller than that of the limiting block.

In some embodiments, the pressing rod disclosed herein comprises a first cylinder; a second cylinder arranged on the upper end surface of the first cylinder, wherein the diameter of the second cylinder is larger than that of the first cylinder; wherein the annular protrusion is arranged on the bottom surface of the second cylinder, the diameter of the second cylinder is smaller than the outer diameter of the annular protrusion; and a gap is formed between the annular projection and the first cylinder for the sleeve of the spring.

In some embodiments, the fixing sleeve disclosed herein comprises a fixing sleeve body with its upper end and the lower end opening; a second annular protrusion arranged at the opening of the upper end and for limiting the passage of the annular protrusion; and an external thread arranged at the lower end of the outer side of the fixing sleeve body; wherein the inner diameter of the fixing sleeve body is equal to the outer diameter of the second cylinder; and the inside wall of the upper end of the mounting hole is arranged with an internal thread matching with the external thread.

Also provided herein is a glass chiller comprising a shell, a high pressure valve as described above arranged in the shell and fixedly coupled to the shell; a control spraying device connected to the air outlet of high pressure valve and extended outside of the shell for controlling the high pressure valve to open or close and capable of cooling the glass, and an air inlet pipeline connected to the air inlet of the high pressure valve and extended outside of the shell to connect with an external high pressure gas storage tank.

In some embodiments, the outside of the shell disclosed herein is further equipped with a fixing device for fixing the shell to the carrier.

In some embodiments, the glass chiller further comprises an electronic switch arranged within the shell for mating with the control spraying device; and a spray indicator light arranged on the shell and exposed to the outer surface of the shell and connected to the electronic switch.

In some embodiments, the control spraying device comprises a resilient bolt fixedly arranged within the shell; a internally hollow protective sleeve arranged at one end of the elastic bolt and extended to the outside of the shell; and an air outlet pipe, one end of which is connected to the air outlet of the high pressure valve and the other end is penetrated through the protective sleeve and extended outside the shell.

In some embodiments, the inside wall of the shell disclosed herein is arranged with at least one longitudinally arranged fixing seat; the side wall of the shell is arranged with an adjusting through hole and used for extending the control spraying device outside the shell and can move longitudinally; and the side wall of the shell is further arranged with an air inlet through hole for extending the air inlet pipeline outside of the shell.

In some embodiments, the inside of the shell is further arranged with a first mounting seat matching with the fixing seat for the installation of the high pressure valve and the control spray device.

In some embodiments, the top of the shell disclosed herein is further arranged with a shell top cover matching with the top of the shell.

In some embodiments, the first mounting seat disclosed herein is further arranged with a second mounting seat for adjusting the height of the highest point of the electronic switch to be flush with the height of the highest point of the high pressure valve.

In some embodiments, the side wall of the protective sleeve is arranged with a notch for insertion of the air outlet pipe.

In some embodiments, the end of the protective sleeve extending out of the shell is further arranged with a hemispherical cap in connection with the protective sleeve, and the air outlet of the air outlet pipe is in connection with the hemispherical cap.

The beneficial effects of the present invention are: compared with the prior art, the manually controlled high pressure valve provided in the invention comprises a valve body having an air inlet, an air outlet and a mounting hole; an adjusting device arranged in the mounting hole by hermetically connecting to the inside wall of the mounting hole and having an air inlet hole and an air outlet hole for controlling the connection or closing of the air inlet and the air outlet; and a limiting block arranged below the adjusting device and matched with the adjusting device and the air inlet for controlling the air intake from the air inlet hole of the adjusting device. By adopting the above design, the limiting block can be jacked up by the high pressure at the air inlet and block off the air inlet to stop jetting outwardly when the gas is not exhausted from the air outlet of the valve; and the limiting block can be removed by the adjusting device to form a gap between the limiting block and the inlet hole when it is required to jet outwardly, and carbon dioxide can enter from the air inlet and jet outwardly through the air outlet of the valve to realize the gas injection, and the structure is simple and ingenious, and has great market competitiveness.

10, valve body; 11, air inlet; 111, first air inlet; 112, second air inlet; 12, air outlet; 13, mounting hole; 131, first mounting hole; 132, second mounting hole; 20, adjusting device; 21, air inlet hole; 22, air outlet hole; 23, connecting pipe; 231, connecting pipe body; 232, sealing ring groove; 233, stepped counter; 24, first annular sealing ring; 25, sealing cover; 251, first through hole; 252, cylindrical sealing cover body; 253, second annular sealing ring; 26, pressing rod; 261, annular protrusion; 262, first cylinder; 263, second cylinder; 27, spring; 28, fixing sleeve; 281, fixing sleeve body; 282, second annular protrusion; 283, external threads; 284, internal threads; 29, end cover; 291, second through hole; 30, limiting block; 40, pressing device; 41, first connecting rod; 42, second connecting rod; 50, shell; 51, fixing seat; 52, adjusting through hole; 53, air inlet through hole; 54, second mounting seat; 55, first mounting seat; 56, shell top cover; 60, control spraying device; 61, resilient bolt; 62, protective sleeve; 63, air outlet pipe; 64, notch; 65, hemispherical cap; 70, air inlet pipeline; 80, fixing device; 81, first connecting plate; 82, second connecting plate; 83, third connecting plate; 84, adjusting bolt; 90, electronic switch; 100, spray indicator light.

DESCRIPTION OF THE PREFERRED EMBODIMENTS

To make the aforementioned purposes, features and advantages of the invention more comprehensible, several embodiments accompanied with drawings are described in detail as follows. In the following description, numerous specific details are set forth in order to provide a thorough understanding of the present invention. This invention may, however, be embodied in many different forms than those herein set forth, and similar modifications may occur to those skilled in the art without departing from the spirit of the invention, and thus the present invention is not limited by the specific embodiments disclosed below.

Figure 1:
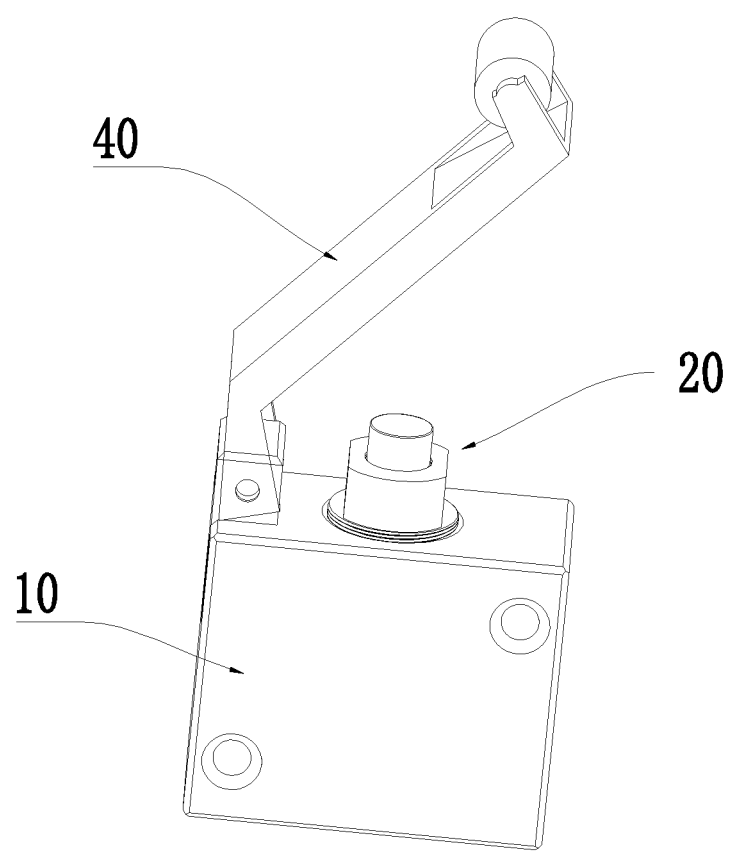
FIG. 1 is a structural schematic view of a manually controlled high pressure valve according to a preferred embodiment of the present invention.
Figure 2:
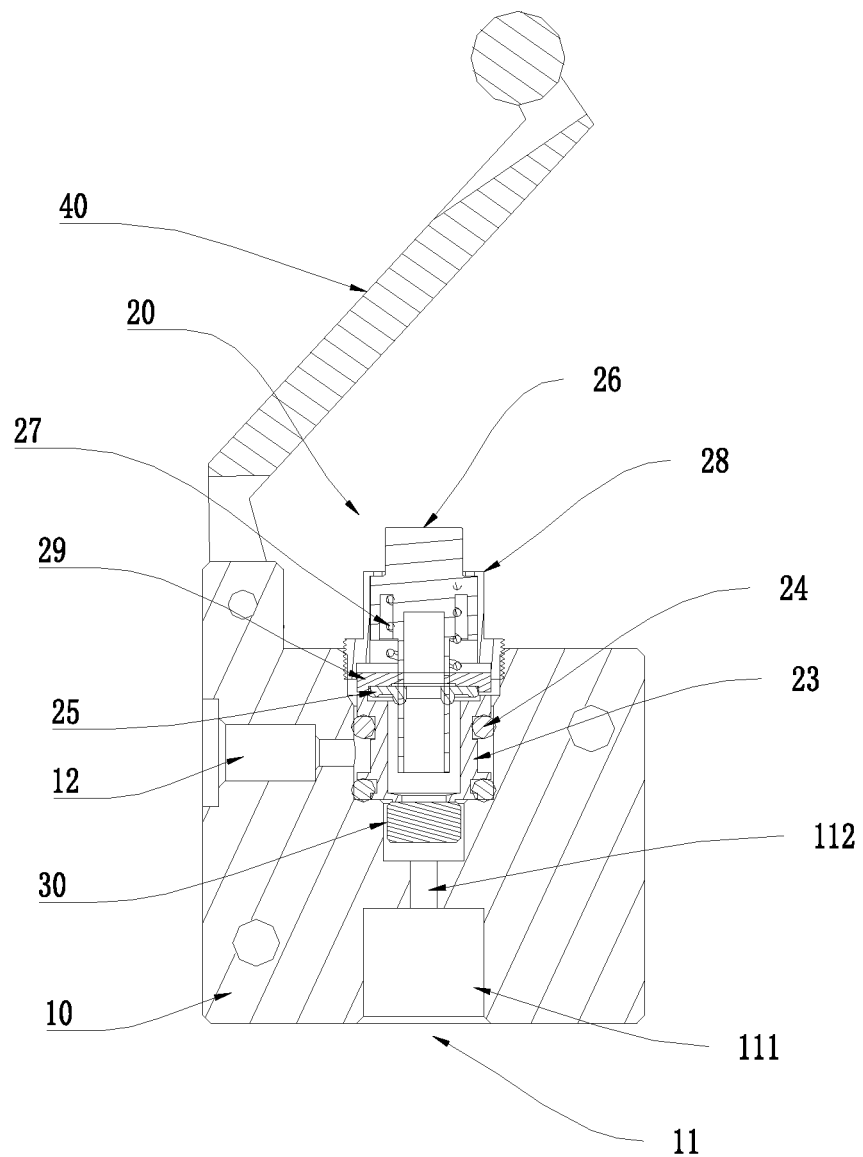
FIG. 2 is a sectional view of a manually controlled high pressure valve according to a preferred embodiment of the present invention.
Figure 3:
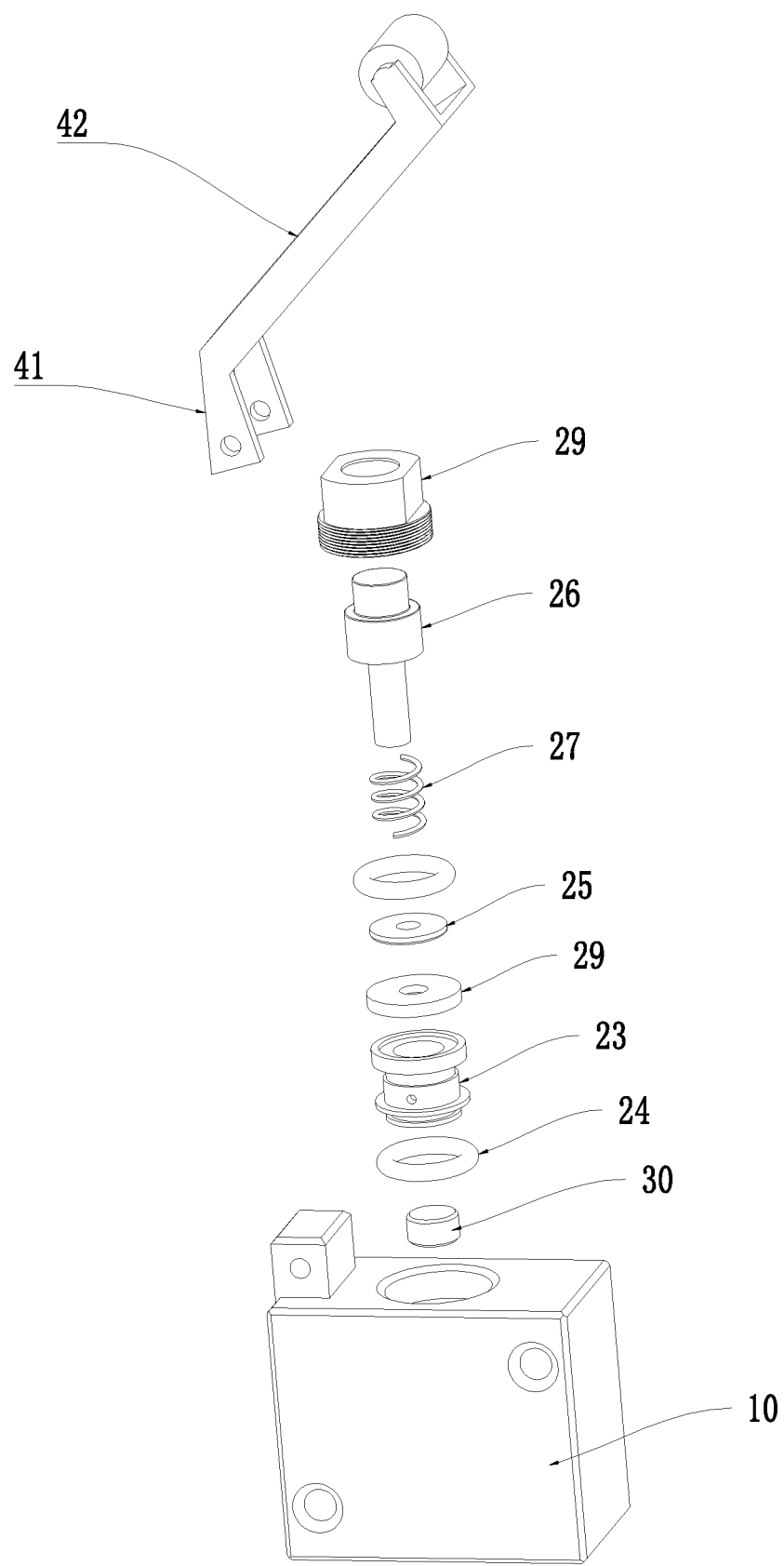
FIG. 3 is an exploded view of a manually controlled high pressure valve according to a preferred embodiment of the present invention.
Figure 4:
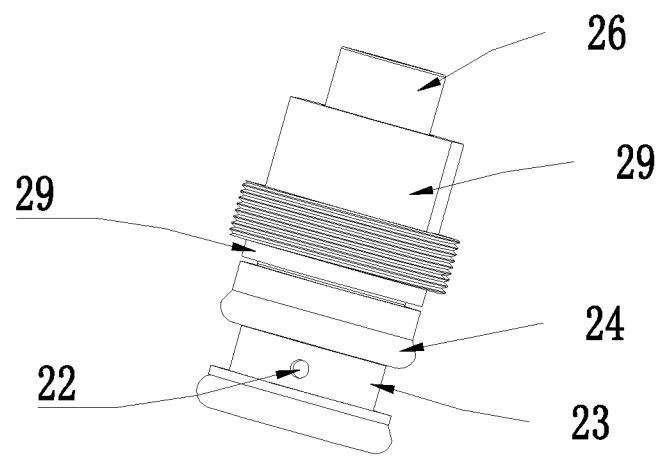
FIG. 4 is an assembling structural schematic view of an adjusting device of a manually controlled high pressure valve according to a preferred embodiment of the present invention.
Figure 5:
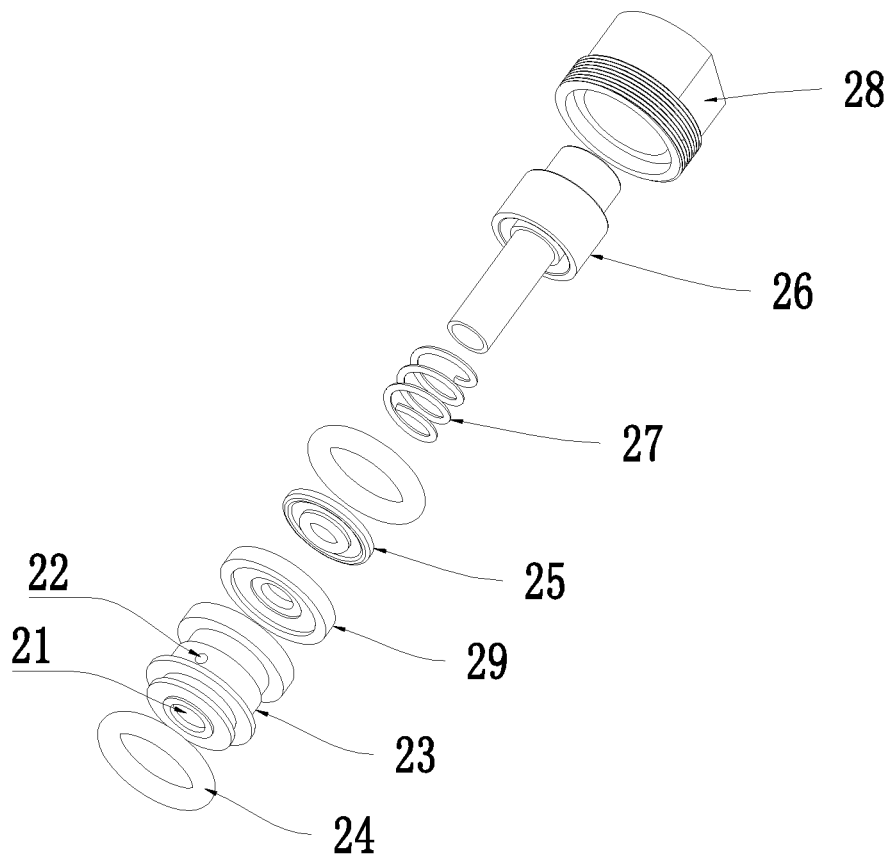
FIG. 5 is an exploded view of an adjusting device of a manually controlled high pressure valve according to a preferred embodiment of the present invention.
Figure 6:
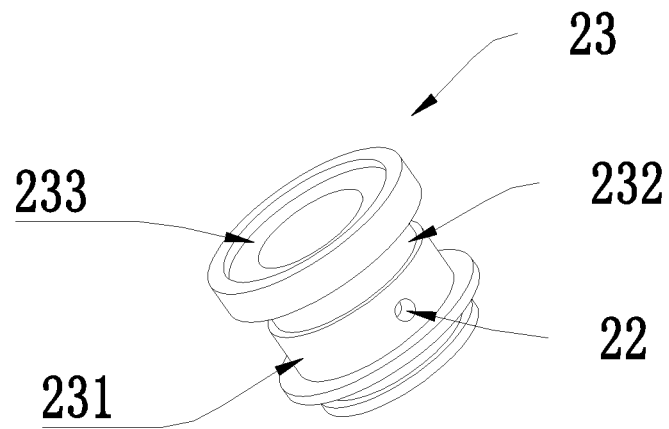
FIG. 6 is a structural schematic view of a connecting pipe of a manually controlled high pressure valve according to a preferred embodiment of the present invention.
Figure 7:
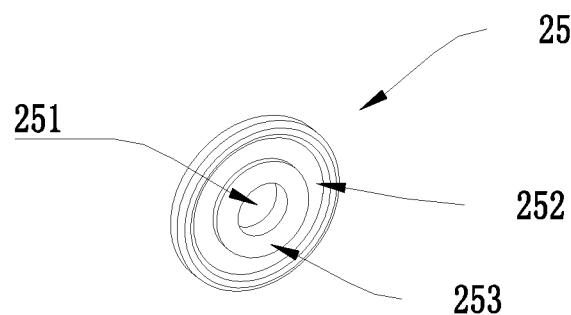
FIG. 7 is a structural schematic view of a sealing cover of a manually controlled high pressure valve according to a preferred embodiment of the present invention.
Figure 8:
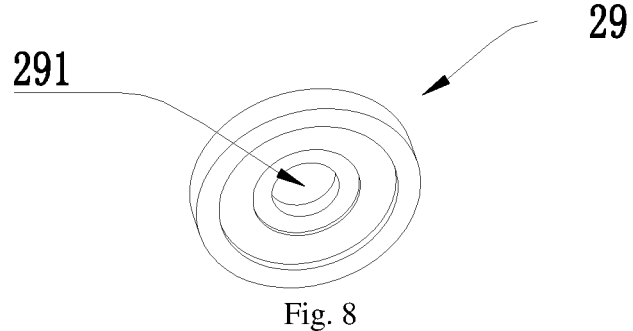
FIG. 8 is a structural schematic view of an end cover of a manually controlled high pressure valve according to a preferred embodiment of the present invention.
Figure 9:
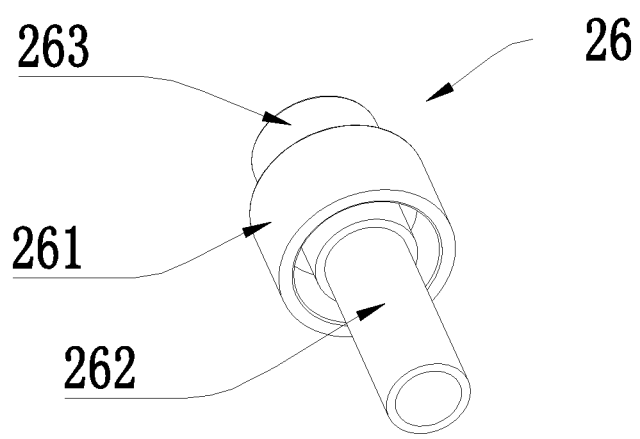
FIG. 9 is a structural schematic view of a pressing rod of a manually controlled high pressure valve according to a preferred embodiment of the present invention.
Figure 10:
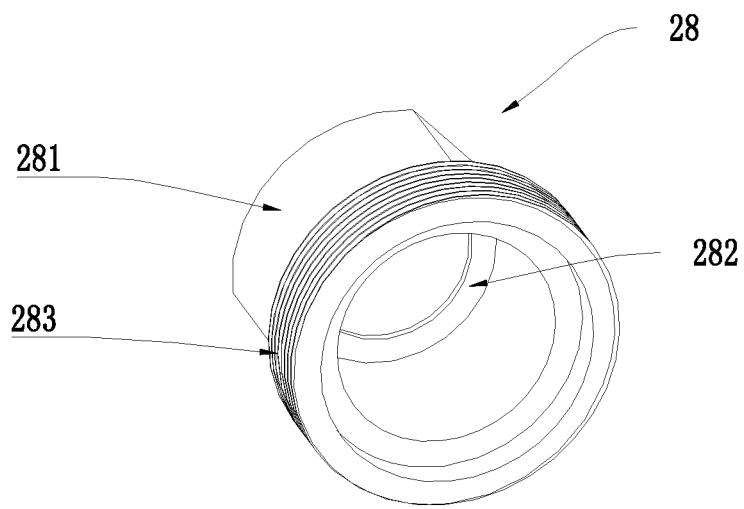
FIG. 10 is a structural schematic view of a fixing sleeve of a manually controlled high pressure valve according to a preferred embodiment of the present invention.
Figure 11:
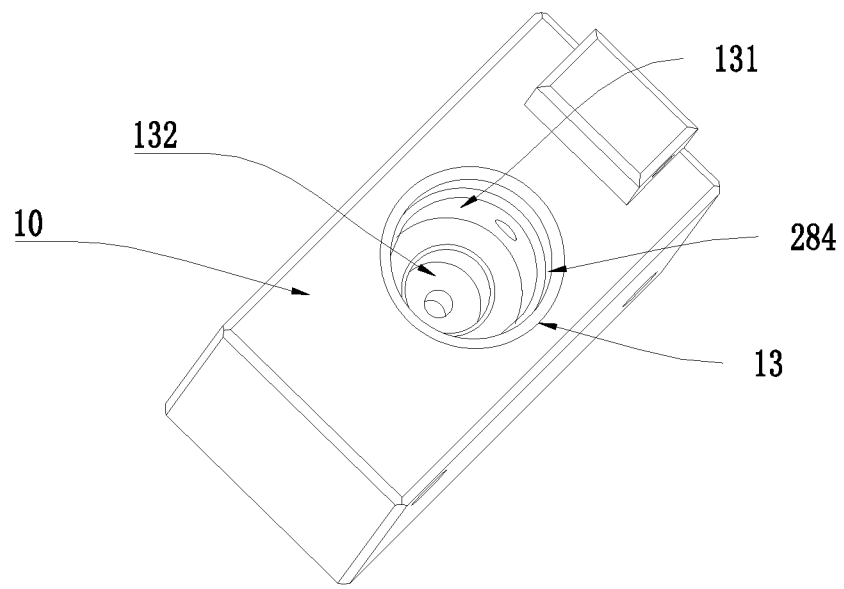
FIG. 11 is a structural schematic view of a valve body of a manually controlled high pressure valve according to a preferred embodiment of the present invention.
Figure 12:
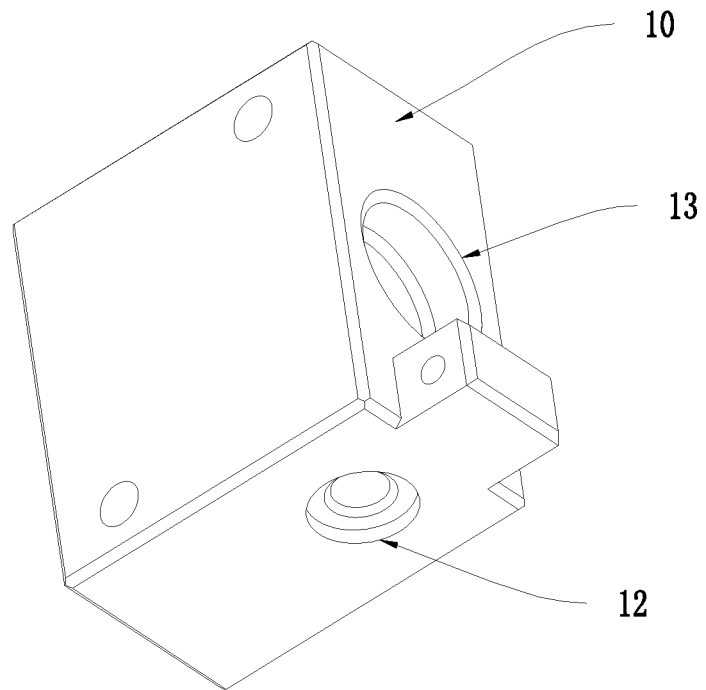
FIG. 12 is a schematic structural view of another angle of a valve body of a manually controlled high pressure valve according to a preferred embodiment of the present invention.

As shown in FIGS. 1 to 12, the present invention provides a manually controlled high pressure valve comprising a valve body 10 having an air inlet 11, an air outlet 12, and a mounting hole 13; a adjusting device 20 arranged in the mounting hole 13 by hermetically connecting to the inside wall of the mounting hole 13 and having an air inlet hole 21 and an air outlet hole 22 for controlling the connection or closing of the air inlet 11 and the air outlet 12; and a limiting block 30 arranged below the adjusting device 20 and matched with the adjusting device 20 and the air inlet 11 for controlling the air intake from the air inlet hole 21 of the adjusting device 20 enters air or not.

Specifically, when the valve is being used, the air inlet 11 of the valve is connected to the high pressure gas storage tank, when under the normal state, the high pressure gas in the high pressure gas storage tank enters into the valve through the air inlet 11 of the valve and acts on the limiting block 30 and jacks up the limiting block 30, then limiting block 30 just blocks the air inlet hole 21 of the adjusting device 20 and prevents gas in the high pressure gas storage tank from entering into the adjusting device 20 through the air inlet hole 21; when it is required to jet outwardly, one just need to drive the adjusting device 20 to push the limiting block 30 down so that a gap is formed between the limiting block 30 and the air inlet hole 21 of the adjusting device 20, the gas in the high pressure gas storage tank enters into the adjusting device 20 through the gap and then enters into the air outlet 12 of the valve through the air outlet hole 22 of the adjusting device 20, so that the gas is jetted out and the gas-jet is realized; when the adjusting device 20 is released, the limiting block 30 is jacked up again by the high pressure without the action of the adjusting device 20, and the air inlet hole 21 of the adjusting device 20 is blocked, and perfect sealing is realized.

In some embodiments, the adjusting device 20 comprises a connecting pipe 23 arranged in the mounting hole 13 which has an open upper end, wherein the air inlet hole 21 is arranged at the lower end of the connecting pipe 23 and the air outlet hole 22 is arranged on the side wall of the connecting pipe 23; two first annular sealing rings 24 arranged on the side wall of the connecting pipe 23 and situated on the upper and the lower side of the air outlet hole 22 and hermetically connected to the inside wall of the mounting hole 13; a sealing cover 25 having a first through hole 251 in the middle arranged at the upper end of the connecting pipe 23 and hermetically connected to the upper end of the connecting pipe 23; a pressing rod 26 having an annular protrusion 261 on its side wall penetrated through the first through hole 251 and inserted into the connecting pipe 23; a spring 27 for returning the pressing rod 26 sleeved outside the pressing rod 26 with its one end arranged on the upper end face of the sealing cover 25 and the other end arranged on the lower end face of the annular protrusion 261; and a fixing sleeve 28 with its upper end penetrated through the top of the pressing rod 26 and cooperatively connected to the annular protrusion 261 and the lower end detachably connected to the mounting hole 13.

Specifically, when the adjusting device 20 needs to be driven, it only needs to press down the top of the pressing rod 26, and the spring 27 in contact with the lower end face of the annular protrusion 261 is compressed, whereas the pressing rod 26 is pressed down, the bottom end of the pressing rod 26 extends into the air inlet hole 21 and penetrates through the air inlet hole 21 to push the limiting block 30 down which withstands the air inlet hole 21, so that the high pressure gas enters into the air inlet hole 21 and jets out from the air outlet 12 of the valve; when it is required to stop the gas-jet, one just need to loosen the pressing rod 26, and the pressing rod 26 returns to the original position under the action of the spring 27 and separates from the limiting block 30, the limiting block 30 is jacked up under the action of the pressure of the high pressure gas storage tank, and blocks the air inlet hole 21 of the adjusting device 20, and the gas-jet is stopped.

In some embodiments, the mounting hole 13 comprises a first mounting hole 131; and a second mounting hole 132 arranged at the lower end of the first mounting hole 131 and connected with the first mounting hole 131; wherein the diameter of the second mounting hole 132 is smaller than that of the first mounting hole 131; and the diameter of the second mounting hole 132 is larger than that of the limiting block 30.

Specifically, the adjusting device 20 is arranged in the first mounting hole 131, the limiting block 30 is arranged in the second mounting hole 132, and it is to be noted that the height of the second mounting hole 132 is higher than that of the limiting block 30. Under the normal state, the limiting block 30 is jacked up by the high pressure of the high pressure gas storage tank to block the air inlet hole 21 of the adjusting device, and a high pressure is formed in the second mounting hole 132, when the adjusting device 20 moves downward and jacks the limiting block 30 downward, a gap is formed between the limiting block 30 and the air inlet hole 21 of the adjusting device 20, meanwhile, the diameter of the second through hole 291 is larger than that of the limiting block 30, and a crevice is reserved between the inside wall of the second through hole 291 and the outside wall of the limiting block 30, so that high pressure gas can enter into the adjusting device 20 through the gap and the crevice.

In some embodiments, the air inlet 11 comprises a first air inlet 111; and a second air inlet 112 arranged at the upper end of the first air inlet 111 and connected with the first air inlet 111 and the mounting hole 13; wherein the diameter of the second air inlet 112 is smaller than that of the first air inlet 111; and the diameter of the second air inlet 112 is smaller than that of the limiting block 30.

Specifically, the design that the diameter of the second air inlet hole 21 is smaller than that of the limiting block 30 avoids the problem that when the air inlet 11 is separated from the high pressure gas storage tank, the limiting block 30 without the action of the high pressure will move downwards and fall out of the air inlet 11 under the action of gravity.

In some embodiments, the valve further comprises a pressing device 40 rotatably arranged on the valve body 10 for facilitating the pressing of the pressing rod 26 downward; wherein the pressing device 40 comprises a first connecting rod 41 rotatably connected to the valve body 10; and a second connecting rod 42 integrally formed with the first connecting rod 41 and forming an obtuse angle with the first connecting rod 41.

Specifically, in the course of use, since the limiting block 30 is jacked up by the high pressure and it is relatively hard to manually press the pressing rod 26 downward, therefore a pressing device 40 which applies the lever principle is designed on the valve body 10, and the pressing rod 26 is easily pressed by pressing the second rod 42.

In some embodiments, the sealing cover 25 comprises a cylindrical sealing cover body 252 having a first through hole 251 arranged in the middle; and a second annular sealing ring 253 fixedly arranged on the lower surface of the cylindrical sealing cover body 252 and surrounded the periphery of the first through hole 251.

Specifically, in order to prevent the gas entering the adjusting device 20 from being discharged through the crevice between the pressing rod 26 and the sealing cover 25, a second annular sealing ring 253 is designed on the lower surface of the first through hole 251 of the sealing cover 25, and the second annular sealing ring 253 is closely matched with the pressing rod 26 to achieve the purpose of sealing.

In some embodiments, the upper end of the sealing cover 25 further has an end cover 29 which has a second through hole 291 arranged in the middle and matches with the sealing cover 25 and detachably connects with the connecting pipe 23 to secure the sealing cover 25 fixed at the upper end of the connecting pipe 23.

In some embodiments, the connecting pipe 23 comprises a connecting pipe body 231 with its upper end opening and its lower end arranged with an air inlet hole 21 and its side wall arranged with an air outlet hole 22; a sealing ring groove 232 arranged on the side wall of the connecting pipe 23 and matched with the first annular sealing ring 24; and a stepped counter 233 arranged on the upper end surface of the connecting pipe body 231 and matched with the sealing cover 25 and the end cover 29; wherein the pressing rod 26 can penetrate through the air inlet hole 21; and the diameter of the air inlet hole 21 is smaller than that of the limit block 30.

In some embodiments, the pressing rod 26 comprises a first cylinder 262; and a second cylinder 263 arranged on the upper end face of the first cylinder 262, wherein the diameter of the second cylinder 263 is larger than that of the first cylinder 262; wherein the annular protrusion 261 is arranged on the bottom surface of the second cylinder 263, and the diameter of the second cylinder 263 is smaller than the outer diameter of the annular protrusion 261; and a gap is formed between the annular protrusion 261 and the first cylinder 262 for the spring 27 to sleeve.

In some embodiments, the fixing sleeve 28 comprises a fixing sleeve body 281 with its upper and lower end opening; a second annular protrusion 282 arranged at the opening of the upper end for limiting the passage of the annular protrusion 261; and an external thread 283 arranged at the lower end of the outer side of the fixing sleeve body 281; wherein the inner diameter of the fixing sleeve body 281 is equal to the outer diameter of the second cylinder 263; and the inside wall of the upper end of the mounting hole 13 is arranged with an internal thread 284 matching with the external thread 283.

Figure 13:
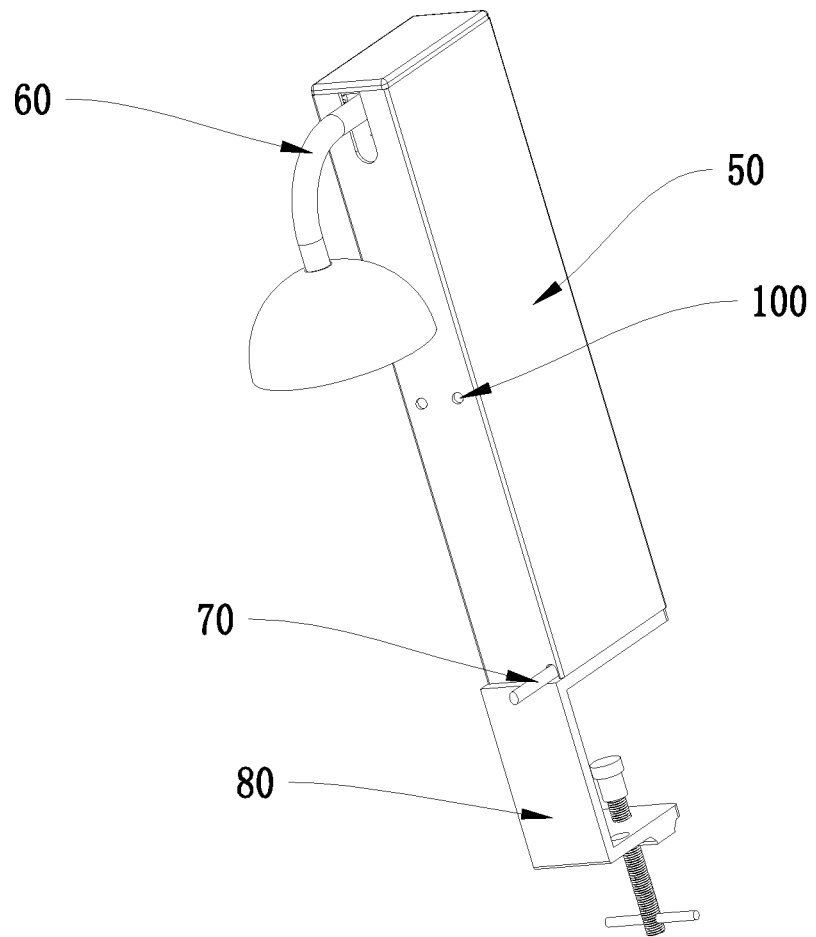
FIG. 13 is a structural schematic view of a glass chiller according to a preferred embodiment of the present invention.
Figure 14:
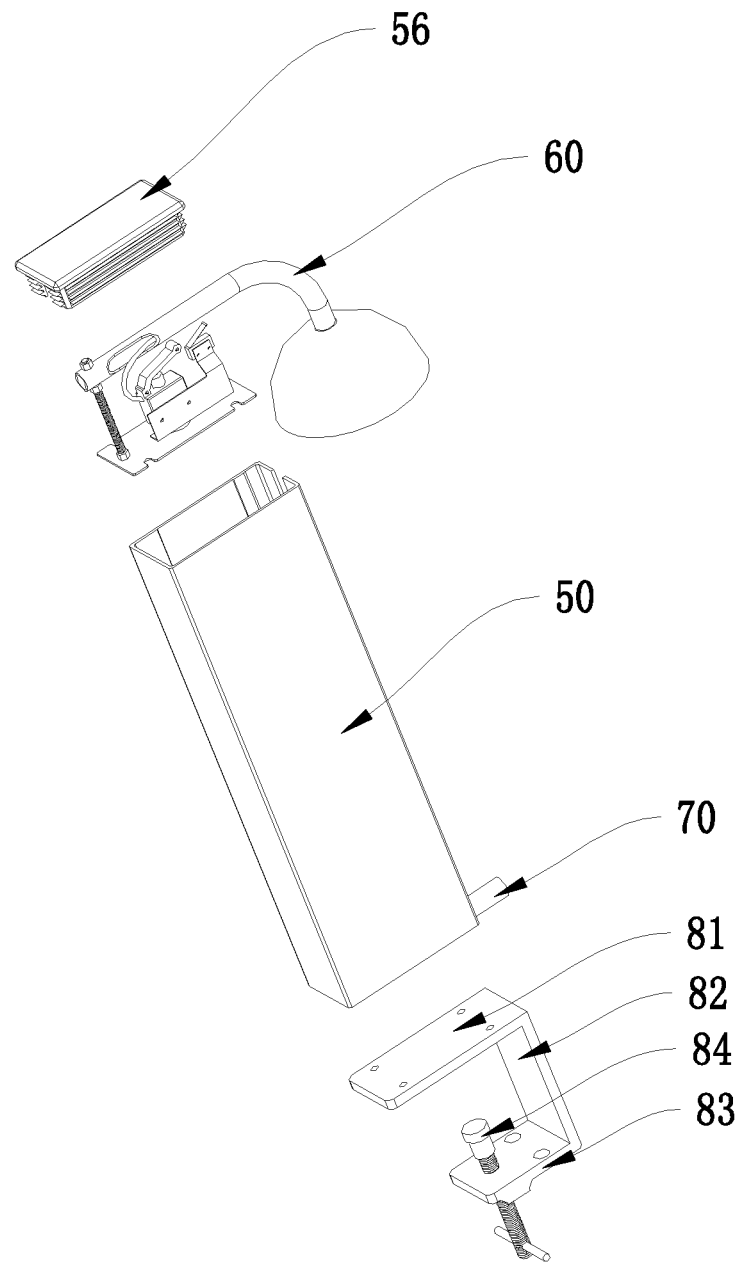
FIG. 14 is an exploded view of a glass chiller according to a preferred embodiment of the present invention.
Figure 15:
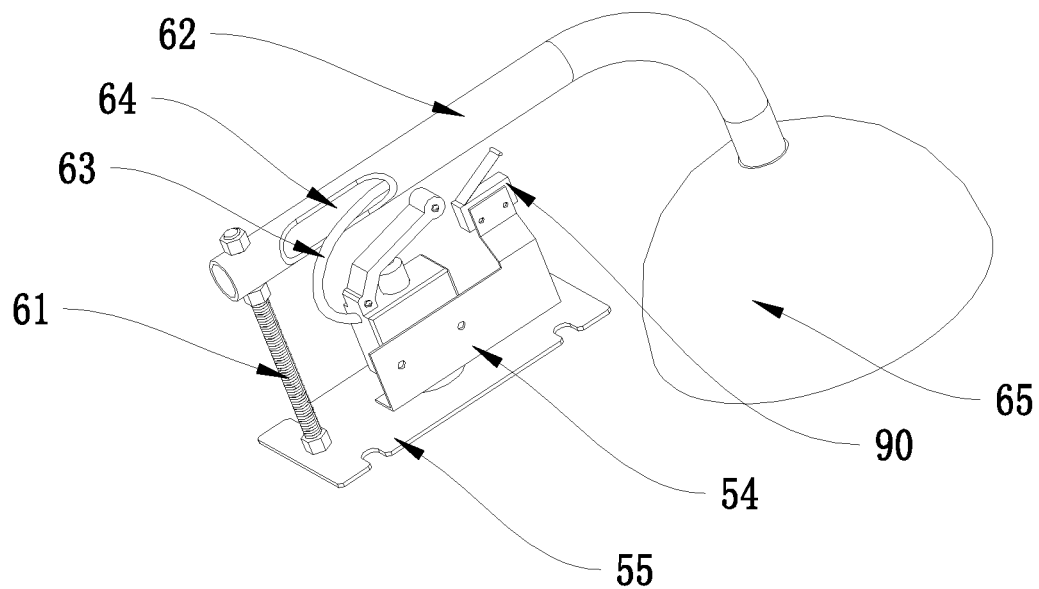
FIG. 15 is a partial structural schematic view of a glass chiller according to a preferred embodiment of the present invention.
Figure 16:
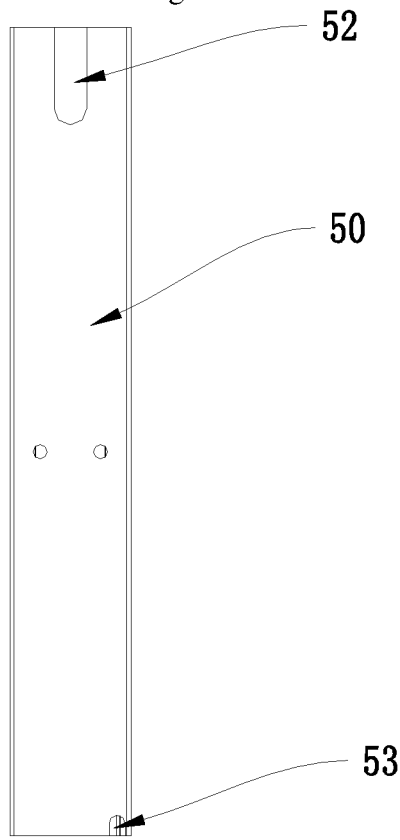
FIG. 16 is a front view of a shell in a glass chiller according to a preferred embodiment of the present invention.
Figure 17:
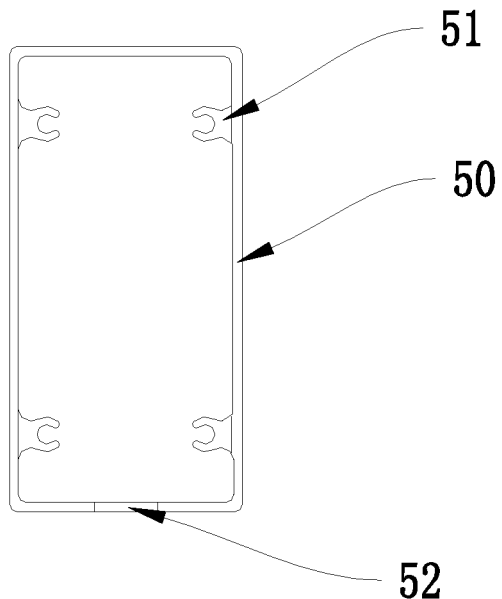
FIG. 17 is a top view of a shell in a glass chiller according to a preferred embodiment of the present invention.
Figure 18:
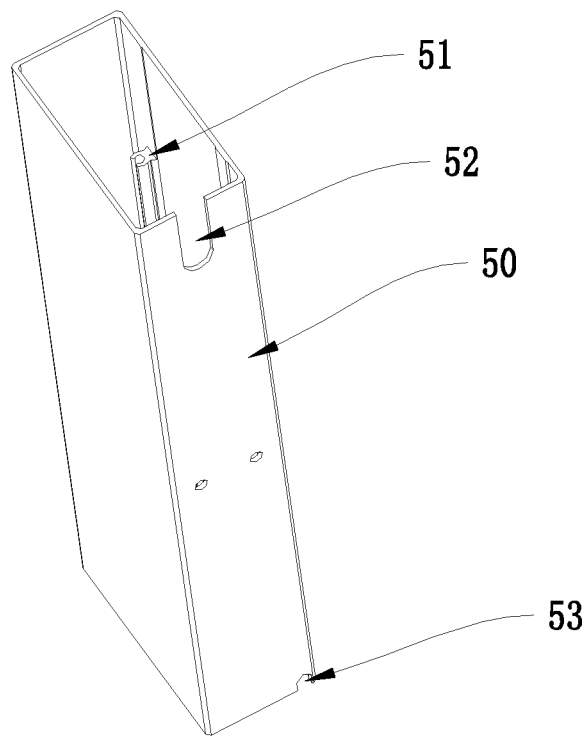
FIG. 18 is a space diagram of a shell in a glass chiller according to a preferred embodiment of the present invention.

As shown in FIGS. 13 to 18, the present invention also provides a glass chiller comprising a shell 50; a high pressure valve as described above arranged in the shell 50 and fixedly connected to the shell 50; a control spraying device 60 connected to the air outlet of high pressure valve and extended outside of the shell 50 for controlling the high pressure valve to open or close and capable of cooling the glass; and an air inlet pipeline 70 connected to the air inlet of the high pressure valve and extended outside of the shell 50 to connect with an external high pressure air storage tank.

Specifically, when the solution is being used, the air inlet pipeline 70 is firstly connected to an external high pressure air storage tank (generally liquid carbon dioxide), by controlling the opening or closing of the high pressure valve via the control spraying device 60, the pressure is changed to finally realize the conversion between the liquid and the gaseous of carbon dioxide, meanwhile, the gaseous carbon dioxide jets from the outlet of the control spraying device 60 and absorbs a large amount of heat at the outlet of the control spraying device 60, at that time, the glass can be rapidly cooled down only by placing the glass therein.

Generally, by spraying the inside wall of the glass first, a layer of white ice crystals is formed on its inside wall, that is a change of the physical form generated from water vapor in the air after the temperature suddenly dropping. At that time, the purpose of rapidly cooling can be achieved only by pouring the wine into the glass.

In some embodiments, the outside of the shell is further equipped with a fixing device 80 for fixing the shell 50 to the carrier.

In order to facilitate the installation after fixing, the fixing device 80 is designed in the solution, and the fixing device 80 comprises a first connecting plate 81 fixedly connected to the bottom surface of the shell 50, a second connecting plate 82 connected to one end of the first connecting plate 81 and arranged perpendicular to the first connecting plate 81, a third connecting plate 83 connected to one end of the second connecting plate 82 and arranged opposite to the first connecting plate 81, and an adjusting bolt 84 screwed on the third connecting plate 83.

When it is required to fix, the adjusting bolt 84 is firstly adjusted downward so that the distance between the adjusting bolt 84 and the first connecting plate 81 becomes large, then the first connecting plate 81 is connected to a table or other carriers by locking connection, finally the whole device is tighted and fixed on the table or other carriers to realize fixation by adjusting the cooperation of the adjusting bolt 84 and the first connecting plate 81.

In some embodiments, the glass chiller further comprises an electronic switch 90 arranged within the shell 50 for matching with the control spraying device 60; and a spray indicator light 100 arranged on the shell 50 and exposed to the outer surface of the shell 50 and connected to the electronic switch 90.

Specifically, the spray indicator light 100 is also designed in the present solution, which is connected to the electronic switch 90 and controls the turn-on and turn-off of the spray indicator light 100 by turning on or turning off the electronic switch 90.

In some embodiments, two spray indicator lights 100 may be designed, namely a working light and a non-working light, and a control panel may be further designed to receive signals from the electronic switch 90 to enable the work light and the non-working light to be turned on and off.

It should be noted that the working light is generally a relatively aggressive light and generally arranged at the air outlet of the control spraying device 60, and a smog-like atmosphere is formed when a meteorology change of the carbon dioxide from the air outlet of the control spraying device 60 occurs, which can achieve a relatively unexpected ambient rendering effect together with effect of the gorgeous working light.

In some embodiments, the control spraying device 60 comprises a resilient bolt 61 fixedly arranged within the shell 50; an internally hollow protective sleeve 62 arranged at one end of the elastic bolt 61 and extended to the outside of the shell 50; and an air outlet pipe 63, one end of which is connected to the air outlet of the high pressure valve and the other end is penetrated through the protective sleeve 62 and extending the outside of the shell 50.

Specifically, by pressing the protective sleeve 62, the protective sleeve 62 is bent downwards under the action of the elastic bolt 61, and the high pressure valve and the electronic switch 90 are designed below the protective sleeve 62, when the protective sleeve 62 deforms, the high pressure valve and the electronic switch 90 can be triggered to turn on to cool the glass down.

It is to be noted that according to the solution, the air outlet pipe 63 connected to the high pressure valve is arranged within the protective sleeve 62, so that the problem of frequently pressing the protective sleeve 62 and causing damage to the air outlet 63 is avoided, and meanwhile, the service life of the product is greatly prolonged by adopting the elastic bolt 61.

In some embodiments, the inside wall of the shell 50 is arranged with at least one longitudinally arranged fixing seat 51; the side wall of the shell 50 is arranged with an adjusting through hole 52 which is used for extending the control spraying device 60 outside the shell 50 and can move longitudinally; the side wall of the shell 50 is further arranged with an air inlet through hole 53 for extending the air inlet pipeline 70 outside of the shell 50.

Specifically, the shell 50 is arranged with an adjusting through hole 52 to facilitate the extension of the protective sleeve 62, meanwhile, the longitudinal diameter of the adjusting through hole 52 is larger than the diameter of the protective sleeve 62, so that the protective sleeve 62 can move longitudinally in the adjusting through hole 52 to play a role of controlling the high pressure valve and the electronic switch 90.

In some embodiments, the inside of the shell 50 is further arranged with a first mounting seat 55 matching with the fixing seat 51 for the installation of the high pressure valve and the control spray device 60.

Specifically, in order to facilitate the installation of the high pressure valve and the elastic bolt 61, the first mounting seat 55 is also designed in the present solution, wherein the first mounting seat 55 is fixed to the fixing seat 51 through bolts, and generally four fixing seats 51 are arranged in the shell 50.

In some embodiments, the top of the shell 50 is further arranged with a shell top cover 56 matching with the top of the shell 50.

In some embodiments, the first mounting seat 55 is further arranged with a second mounting seat 54 for adjusting the height of the highest point of the electronic switch 90 to be flush with the height of the highest point of the high pressure valve.

Specifically, in order to facilitate simultaneous triggering of the high pressure valve and the electronic switch 90 when the protective sleeve 62 is pressed down, it is generally necessary to design the highest point of the high pressure valve and the electronic switch 90 to be of equal height or the component near the pressing portion of the protective sleeve 62 is slightly higher than that away from the pressing portion of the protective sleeve 62. However, the difference between the high pressure valve and the electronic switch 90 mentioned in the actual product is large, so that a second mount 54 is designed on the first mount 55, by adjusting the height of the electronic switch 90 through the second mounting seat 54, and the purpose that the protective sleeve 62 simultaneously triggering the high pressure valve and the electronic switch 90 is finally achieved.

In some embodiments, the side wall of the protective sleeve 62 is arranged with a notch 64 for insertion of the air outlet pipe 63.

In some embodiments, the end of the protective sleeve 62 extending outside the shell 50 is further arranged with a hemispherical cap 65 in connection with the protective sleeve 62, and the air outlet of the air outlet pipe 63 is in connection with the hemispherical cap 65.

In particular, the solution using a hemispherical cap 65 avoids the problem of non-directionality when the meteorology change of carbon dioxide occurs.

In summary, provided herein is a manually controlled high pressure valve comprising a valve body 10 having an air inlet 11, an air outlet 12 and a mounting hole 13; an adjusting device 20 arranged in the mounting hole 13 by hermetically connecting to the inside wall of the mounting hole 13 and having an air inlet hole 21 and an air outlet hole 22 for controlling the connection or closing of the air inlet 11 and the air outlet 12; and a limiting block 30 arranged below the adjusting device 20 and matched with the adjusting device 20 and the air inlet 11 for controlling the air intake from the air inlet hole 21 of the adjusting device 20. By adopting the above design, the limiting block 30 can be jacked up by the high pressure at the air inlet 11 and block off the air inlet to stop jetting outwardly when the gas is not exhausted from the air outlet of the valve; and the limiting block 30 can be removed by the adjusting device 20 to form a gap between the limiting block 30 and the inlet hole 21 when it is required to jet outwardly, and carbon dioxide can enter from the air inlet 11 and jet outwardly through the air outlet 12 of the valve to realize the gas injection, and the structure is simple and ingenious, and has great market competitiveness.

The above-described embodiments illustrate only two embodiments of the invention, the descriptions of which are specific and detailed, but are not to be construed as limiting the scope of the invention. It should be noted that several variations and modifications may be made by those skilled in the art without departing from the spirit of the invention, which fall within the scope of the invention. Therefore, the scope of protection for the invention application shall be determined by the appended claims.

What is claimed is:

1. A manually controlled high pressure valve, comprising:
  a valve body having an air inlet;
  an air outlet and a mounting hole;
  an adjusting device arranged in the mounting hole by hermetically connecting to an inside wall of the mounting hole and having an air inlet hole and an air outlet hole for controlling the connection or closing of the air inlet and the air outlet; and
  a limiting block arranged below the adjusting device and matched with the adjusting device and the air inlet for controlling air intake from the air inlet hole of the adjusting device;
  wherein the adjusting device further comprises a connecting pipe arranged in the mounting hole which has an open upper end; the air inlet hole is arranged at a lower end of the connecting pipe and the air outlet hole is arranged on a side wall of the connecting pipe; two first annular sealing rings are arranged on the side wall of the connecting pipe and situated on an upper and a lower sides of the air outlet hole and hermetically connected to the inside wall of the mounting hole; a sealing cover having a first through hole in a middle is arranged at the open upper end of the connecting pipe and hermetically connected to the open upper end of the connecting pipe; a pressing rod having an annular protrusion penetrates through the first through hole and is inserted into the connecting pipe; a spring for returning the pressing rod is sleeved outside the pressing rod with one end arranged on an upper end face of the sealing cover and an other end arranged on a lower end face of the annular protrusion; and an upper end of a fixing sleeve penetrates through a top of the pressing rod and is cooperatively connected to the annular protrusion and a lower end of the fixing sleeve is detachably connected to the mounting hole;
  the sealing cover comprises a cylindrical sealing cover body having the first through hole in the middle and a second annular sealing ring fixedly arranged on a lower surface of the cylindrical sealing cover body and surrounded the periphery of the first through hole.

2. The manually controlled high pressure valve of claim 1, wherein the mounting hole comprises a first mounting hole and a second mounting hole arranged at a lower end of the first mounting hole and connected with the first mounting hole; a diameter of the second mounting hole is smaller than that of the first mounting hole; and the diameter of the second mounting hole is larger than that of the limiting block.

3. The manually controlled high pressure valve of claim 1, wherein the air inlet comprises a first air inlet and a second air inlet arranged at an upper end of the first air inlet and connected with the first air inlet and the mounting hole; a diameter of the second air inlet is smaller than that of the first air inlet; and the diameter of the second air inlet is smaller than that of the limiting block.

4. The manually controlled high pressure valve of claim 1, wherein the valve further comprises a pressing device rotatably arranged on the valve body for facilitating the pressing of the pressing rod; the pressing device comprises a first connecting rod rotatably connected to the valve body; a second connecting rod integrally formed with the first connecting rod and forming an obtuse angle with the first connecting rod.

5. The manual control high pressure valve of claim 1, wherein an upper end of the sealing cover further comprises an end cover having a second through hole in the middle and matching with the sealing cover and detachably connecting with the connecting pipe to secure the sealing cover at the upper end of the connecting pipe.

6. The manual control high pressure valve of claim 5, wherein the connecting pipe comprises a connecting pipe body; an upper end opening and a lower end of the connecting pipe body are arranged with an air inlet hole and a side wall of the connecting pipe body is arranged with an air outlet hole; a sealing ring groove is arranged on the side wall of the connecting pipe and matched with the first annular sealing ring; and a stepped counter is arranged on an upper end surface of the connecting pipe body and matched with the sealing cover and the end cover; the pressing rod penetrates through the air inlet hole; and a diameter of the air inlet hole is smaller than that of the limiting block.

7. The manually controlled high pressure valve of claim 1, wherein the pressing rod comprises a first cylinder and a second cylinder arranged on an upper end surface of the first cylinder; a diameter of the second cylinder is larger than that of the first cylinder; an annular protrusion is arranged on a bottom surface of the second cylinder; diameter of the second cylinder is smaller than an outer diameter of the annular protrusion; and a gap is formed between the annular projection and the first cylinder for the fixing sleeve of the spring.

8. The manually controlled high pressure valve of claim 7, wherein the fixing sleeve comprises a fixing sleeve body with an opening upper end and an opening lower end a second annular protrusion arranged at the opening upper end for limiting a passage of the annular protrusion; and an external thread arranged at a lower end of an outer side of the fixing sleeve body; wherein an inner diameter of the fixing sleeve body is equal to an outer diameter of the second cylinder; and an inside wall of the upper end of the mounting hole is arranged with an internal thread matching with the external thread.

9. A glass chiller comprising a shell, a high pressure valve of claim 1 arranged in the shell and fixedly coupled to the shell, a control spraying device connected to the air outlet of high pressure valve and extended outside of the shell for controlling the high pressure valve to open or close and capable of cooling a glass, and an air inlet pipeline connected to the air inlet of the high pressure valve and extended outside of the shell to connect with an external high pressure gas storage tank.

10. The glass chiller of claim 9, wherein an outside of the shell is further provided a fixing device for fixing the shell to a carrier.

11. The glass chiller of claim 9, wherein the glass chiller further comprises an electronic switch arranged within the shell for matching with the control spraying device and a spray indicator light arranged on the shell and exposed to an outer surface of the shell and connected to the electronic switch.

12. The glass chiller of claim 9, wherein the control spraying device comprises a resilient bolt fixedly arranged within the shell; an internally hollow protective sleeve arranged at one end of the resilient bolt and extended to an outside of the shell; and an air outlet pipe; one end of the air outlet pipe is connected to the air outlet of the high pressure valve and the other end penetrates through the protective sleeve and extended the outside of the shell.

13. The glass chiller of claim 11, wherein an inside wall of the shell is arranged with at least one longitudinally arranged fixing seat; a side wall of the shell is arranged with an adjusting through hole for extending the control spraying device outside the shell and moving longitudinally; and the side wall of the shell is further arranged with an air inlet through hole for extending an air inlet pipeline outside of the shell.

14. The glass chiller of claim 13, wherein the inside wall of the shell is further arranged with a first mounting seat matching with the fixing seat for the installation of the high pressure valve and the control spraying device.

15. The glass chiller of claim 14, wherein a top of the shell is further arranged with a shell top cover matching with the top of the shell.

16. The glass chiller of claim 15, wherein the first mounting seat is further arranged with a second mounting seat for adjusting a height of a highest point of the electronic switch to be flush with the height of the highest point of the high pressure valve.

17. The glass chiller of claim 12, wherein a side wall of the protective sleeve is arranged with a notch for an insertion of the air outlet pipe.

18. The glass chiller of claim 12, wherein an end of the protective sleeve extending out of the shell is further arranged with a hemispherical cap in connection with the protective sleeve, and the air outlet of the air outlet pipe is in connection with the hemispherical cap.

\* \* \* \* \*